US007016933B2

(12) United States Patent
Glass et al.

(10) Patent No.: US 7,016,933 B2
(45) Date of Patent: Mar. 21, 2006

(54) TRANSLATION AND SUBSTITUTION OF TRANSMITTED ENVIRONMENTAL DATA (75) Inventors: David Wayne Glass, Georgetown, KY (US); James Gordon McLean, Fuquay-Varina, NC (US); Clifford Alan Pickover, Yorktown Heights, NY (US); Daniel James Winarski, Tucson, AZ (US); Tin-Lup Wong, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/957,617

(22) Filed: Sep. 20, 2001

(65) Prior Publication Data
US 2003/0055879 A1    Mar. 20, 2003

(51) Int. Cl.
*G06F 15/16* (2006.01)
(52) U.S. Cl. ..................................... 709/200; 709/202
(58) Field of Classification Search ..................... None
See application file for complete search history.

(56) References Cited

U.S. PATENT DOCUMENTS

| 4,858,152 | A |   | 8/1989  | Estes ............................ 364/550 |
|-----------|---|---|---------|--------------------------------------------|
| 5,398,070 | A | * | 3/1995  | Lee .............................. 348/553  |
| 5,796,986 | A |   | 8/1998  | Fuller .......................... 395/500   |
| 5,920,492 | A | * | 7/1999  | Montag et al. ................. 703/6       |
| 6,024,783 | A | * | 2/2000  | Budman ......................... 96/222     |
| 6,115,035 | A |   | 9/2000  | Compton et al. ............. 345/327        |
| 6,161,176 | A |   | 12/2000 | Hunter et al. .................. 713/1     |
| 6,500,008 | B1| * | 12/2002 | Ebersole et al. ............. 434/226       |
| 6,517,437 | B1| * | 2/2003  | Wells et al. .................. 463/30     |
| 6,606,566 | B1| * | 8/2003  | Sunshine ...................... 702/22     |
| 6,820,012 | B1| * | 11/2004 | Sunshine ...................... 702/22     |

FOREIGN PATENT DOCUMENTS

| JP | 4167173 A | 6/1992  |
|----|-----------|---------|
| JP | 5303590 A | 11/1993 |

* cited by examiner

Primary Examiner—John B. Walsh
(74) Attorney, Agent, or Firm—Robert A. Voigt, Jr.; Winstead Sechrest & Minick P.C.

(57) ABSTRACT

A method, system and computer program product for generating an alternative form of transmitted environmental data, e.g., scent information, air temperature settings, air humidity settings, triggering of infrared devices such as to create tactile warmth. Upon identifying one or more environmental data files in a received file, e.g., HTML file, environmental data associated with the data files may be read and interpreted. If there are no environmental devices, e.g., smell-generating device, configured to emit a response to the environmental data or if the environmental devices are disabled from emitting a response to the environmental data, then the environmental data may be translated into a form a computer may be capable of reproducing. The translated form may then be outputted in a variety of forms such as: pictorial data (e.g., picture of a pine tree substituting a pine smell), graphical effects (e.g., screen-flashing effect may substitute a strobe-light trigger).

8 Claims, 4 Drawing Sheets

TRANSLATION AND SUBSTITUTION OF TRANSMITTED ENVIRONMENTAL DATA

TECHNICAL FIELD

The present invention relates to the field of transmitting environmental data over a network system, and more particularly to translating and substituting received environmental data into a form a computer may be capable of reproducing.

BACKGROUND INFORMATION

The development of computerized distribution information systems, such as the Internet, allows users to link with servers and networks, and thus retrieve vast amounts of electronic information that was previously unavailable using conventional electronic mediums. Such electronic information increasingly is replacing the more conventional means of information such as newspapers, magazines and television.

Users may be linked to the Internet through a hypertext system of servers commonly referred to as the World Wide Web (WWW). With the World Wide Web, an entity having a domain name may create a "web page" or "page" that can provide information and to a limited degree some interactivity.

A computer user may "browse", i.e. navigate around, the WWW by utilizing a suitable web browser, e.g., Netscape Navigator™, Internet Explorer™, and a network gateway, e.g., Internet Service Provider (ISP). A web browser allows the user to specify or search for a web page on the WWW and subsequently retrieve and display web pages on the user's computer screen. Such web browsers are typically installed on personal computers or workstations to provide web client services, but increasingly may be found on wireless devices such as cell phones.

The Internet is based upon a suite of communication protocols known as Transmission Control Protocol/Internet Protocol (TCP/IP) which sends packets of data between a host machine, e.g., server computer on the Internet commonly referred to as web server, and a client machine, e.g., a user's computer connected to the Internet. The WWW is a network of computers that use an Internet interface protocol which is supported by the same TCP/IP transmission protocol.

As stated above, users may receive packets of data from a server via the Internet. The packets of data may comprise what is commonly referred to as environmental data. Environmental data may include data that allows devices, e.g., smell generating devices, coupled to the user's machine configured to emit particular scents such as developed by Digiscents™. However, not all computers may include such devices, e.g., smell generating devices, configured to emit particular scents in response to receiving environmental data.

It would therefore be desirable to translate and substitute environmental data into a form a computer may be capable of reproducing.

SUMMARY

The problems outlined above may at least in part be solved in some embodiments by translating the environmental data into a form a computer may be capable of reproducing if there are no environmental devices, e.g., smell-generating device, configured to emit a response to the environmental data or if the environmental devices are disabled from emitting a response to the environmental data.

In one embodiment, a method for generating an alternative form of transmitted environmental data may comprise the step of receiving a file, e.g., HTML file, specifying one or more environmental data files. The source code of the file may then be parsed to identify one or more environmental data files. Upon identifying the one or more environmental data files, environmental data, e.g., scent information, air temperature settings, air humidity settings, lighting effects such as controlling the amount of ambient light and triggering strobes, special effects, triggering of airflow effects such as fans, triggering of infrared devices such as to create tactile warmth, associated with the data files may be read. The environmental data read may then be interpreted. For example, if the environmental data comprised a combination of scents then those combination of scents may have to be interpreted in order to determine the particular scent, e.g., floral smell, that is intended to be released in an environmental device, e.g., smell-generating peripheral device.

Upon interpreting the environmental data, a determination may be made as to whether the interpreted environmental data is acceptable to be implemented. If the interpreted environmental data is not acceptable to be implemented, e.g., unpleasant smell, then the interpreted environmental data may be blocked or substituted with an acceptable environmental response, e.g., pleasant smell, and/or issue a warning indicating that the interpreted environmental data was unacceptable. If the interpreted environmental data is acceptable to be implemented, then a determination may be made as to whether there are one or more appropriate environmental devices, e.g., smell-generating peripheral device, configured to emit a response to the interpreted environmental data, e.g., floral scent. If there are one or more appropriate environmental devices, then a determination may be made as to whether the user has disabled those one or more environmental devices. If the user has not disabled those one or more environmental devices, e.g., smell-generating peripheral device, then those one or more environmental devices may be executed to emit a response to the environmental data, e.g., produce a floral scent.

If there are no environmental devices, e.g., smell-generating device, configured to emit a response to the environmental data or if the environmental devices are disabled from emitting a response to the environmental data, then environmental data may be translated into a form a computer is capable of reproducing. In one embodiment, the environmental data may be translated by searching a table configured to comprise a listing of entries of interpreted environmental data along with associated entries of translated forms capable of being reproduced. For example, the table may comprise an entry of a particular floral scent and an associated entry comprising the translated form of the floral scent, e.g., pointer to a graphics file of a picture of a particular flower. In another embodiment, the environmental data may be translated by executing an algorithm that translates the interpreted environmental data into a form capable of being reproduced. For example, a temperature or lighting command may be translated by the algorithm into adjusting the background color settings for an active window displayed on a display. The translated form may then be outputted in a variety of forms such as: pictorial data (e.g., picture of a pine tree substituting a pine smell), graphical effects (e.g., screen-flashing effect may substitute a strobe-light trigger), textual data (e.g., scrolling text, pop-up bubbles), audio data (e.g., synthesized or pre-recorded speech), sound effects (e.g., "sizzling" sound may represent a hot environment setting), and musical selections (e.g., playing the song "Everything's Coming Up Roses" substituting a floral scent).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for generating an alternative form of transmitted environmental data, e.g., scent information, air temperature settings, air humidity settings, triggering of infrared devices such as to create tactile warmth. In one embodiment, a method may comprise the step of identifying one or more environmental data files in a received file, e.g., HTML file. The environmental data associated with the data files identified may then be read and interpreted. If there are no environmental devices, e.g., smell generating device, configured to emit a response to the environmental data or if the environmental devices are disabled from emitting a response to the environmental data, then the environmental data may be translated into a form a computer may be capable of reproducing. In one embodiment, the environmental data may be translated by searching a table configured to comprise a listing of entries of interpreted environmental data along with associated entries of translated forms capable of being reproduced. In another embodiment, the environmental data may be translated by executing an algorithm that translates the interpreted environmental data into a form capable of being reproduced. The translated form may then be output in a variety of forms such as: pictorial data (e.g., picture of a pine tree substituting a pine smell), graphical effects (e.g., screen-flashing effect may substitute a strobe-light trigger), textual data (e.g., scrolling text, pop-up bubbles), audio data (e.g., synthesized or pre-recorded speech), sound effects (e.g., "sizzling" sound may represent a hot environment setting), and musical selections (e.g., playing the song "Everything's Coming Up Roses" substituting a floral scent).

Figure 1:
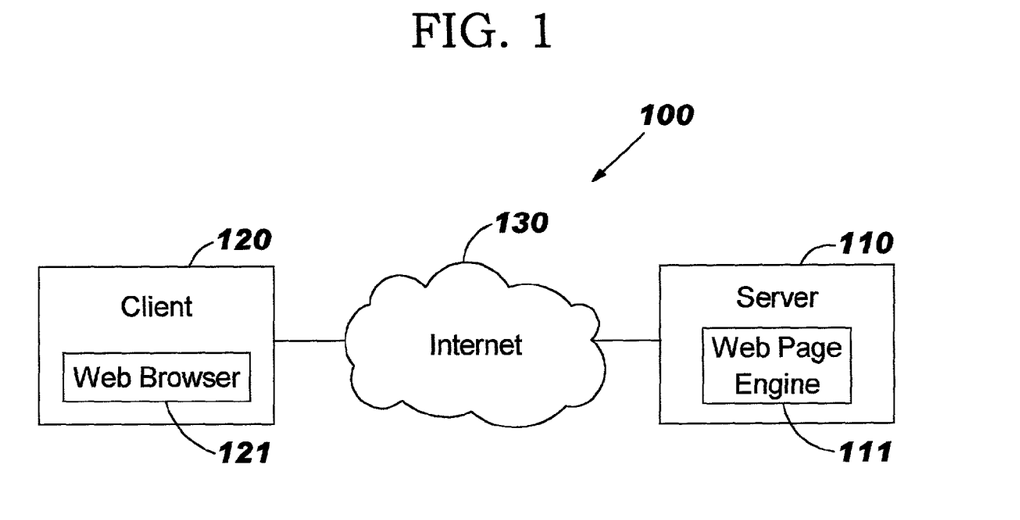
FIG. 1 illustrates a network system configured in accordance with the present invention.

FIG. 1—Network System

FIG. 1 illustrates an embodiment of the present invention of a network system 100. Network system 100 may comprise a server 110 connected to a client 120 via the Internet 130. The Internet 130 may refer to a network of computers. It is further noted that the connection between client 120 and server 110 may be any medium type, e.g., wireless, wired. It is further noted that client 120 may be any type of device, e.g., wireless, Personal Digital Assistant (PDA), cell phone, personal computer system, workstation, Internet appliance, configured with the capability of connecting to the Internet 130 and consequently communicating with server 110. It is further noted that network system 100 may be any type of system that has at least one server and at least one client and that FIG. 1 is not to be limited in scope to any one particular embodiment. For example, system 100 may comprise a network such as a Local Area Network (LAN), e.g., Ethernet, Token Ring, ARCnet, in substitution of Internet 130.

Server 110 may comprise a web page engine 111 for maintaining and providing access to an Internet web page which is enabled to forward a Hyper-Text Mark-up Language (HTML) file to a web browser 121 of client 120. While the illustrated client engine is web browser 121, those skilled in the art will recognize that other client engines may be used in accordance with the present invention. The HTML file may specify environmental data files comprising environmental data content, e.g., scent information, air temperature settings, air humidity settings, lighting effects such as controlling the amount of ambient light and triggering strobes, special effects, triggering of airflow effects such as fans, triggering of infrared devices such as to create tactile warmth. The HTML file may be parsed to identify environmental data files by a program as discussed in FIG. 3. Once the environmental data files have been identified, the environmental data associated with the environmental data files may be interpreted and translated into a form client 120 is capable of reproducing by the program as discussed in FIG. 3.

Figure 2:
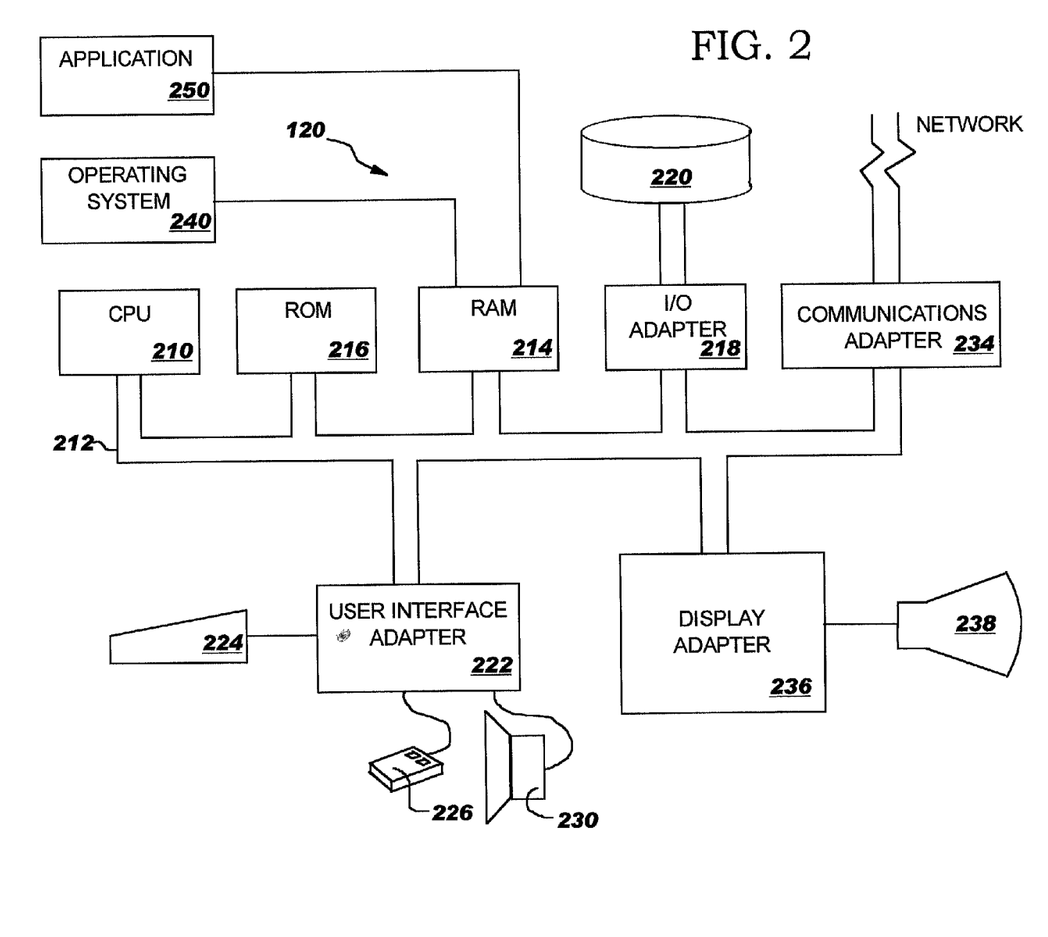
FIG. 2 illustrates an embodiment of the present invention of a client in a network system.

FIG. 2—Hardware Configuration of Client

FIG. 2 illustrates a typical hardware configuration of client 120 which is representative of a hardware environment for practicing the present invention. Client 120 has a central processing unit (CPU) 210 coupled to various other components by system bus 212. An operating system 240, runs on CPU 210 and provides control and coordinates the function of the various components of FIG. 2. Application 250, e.g., program for translating and substituting environmental data, as described in FIG. 3, web browser 121 with the program for translating and substituting environmental data as a plug-in to web browser 121, runs in conjunction with operating system 240 and provides output calls to operating system 240 which implements the various functions to be performed by the application 250. Read only memory (ROM) 216 is coupled to system bus 212 and includes a basic input/output system ("BIOS") that controls certain basic functions of client 120. Random access memory (RAM) 214, I/O adapter 218, and communications adapter 234 are also coupled to system bus 212. It should be noted that software components including operating system 240 and application 250 are loaded into RAM 214 which is the computer system's main memory. I/O adapter 218 may be a small computer system interface ("SCSI") adapter that communicates with disk unit 220, e.g., disk drive. It is noted that the program of the present invention that translates and substitutes environmental data, as described in FIG. 3, may reside in disk unit 220 or in application 250. It is further noted that the program of the present invention that translates and substitutes environmental data, as described in FIG. 3, may be a plug-in to web browser 121 residing in disk unit 220 or in application 250.

Communications adapter 234 interconnects bus 212 with an outside network enabling client 120 to communicate with other such systems via a Local Area Network (LAN), e.g., Ethernet, Token Ring, ARCnet, or a Wide Area Network (WAN), e.g., Internet 130. Input/Output devices are also connected to system bus 212 via a user interface adapter 222 and a display adapter 236. Keyboard 224, mouse 226 and speaker 230 are all interconnected to bus 212 through user interface adapter 222. Event data may be inputted to client 120 through any of these devices. A display monitor 238 is connected to system bus 212 by display adapter 236. In this manner, a user is capable of inputting to client 120 through keyboard 224 or mouse 226 and receiving output from client 120 via display 238 or speaker 230.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by client 120, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
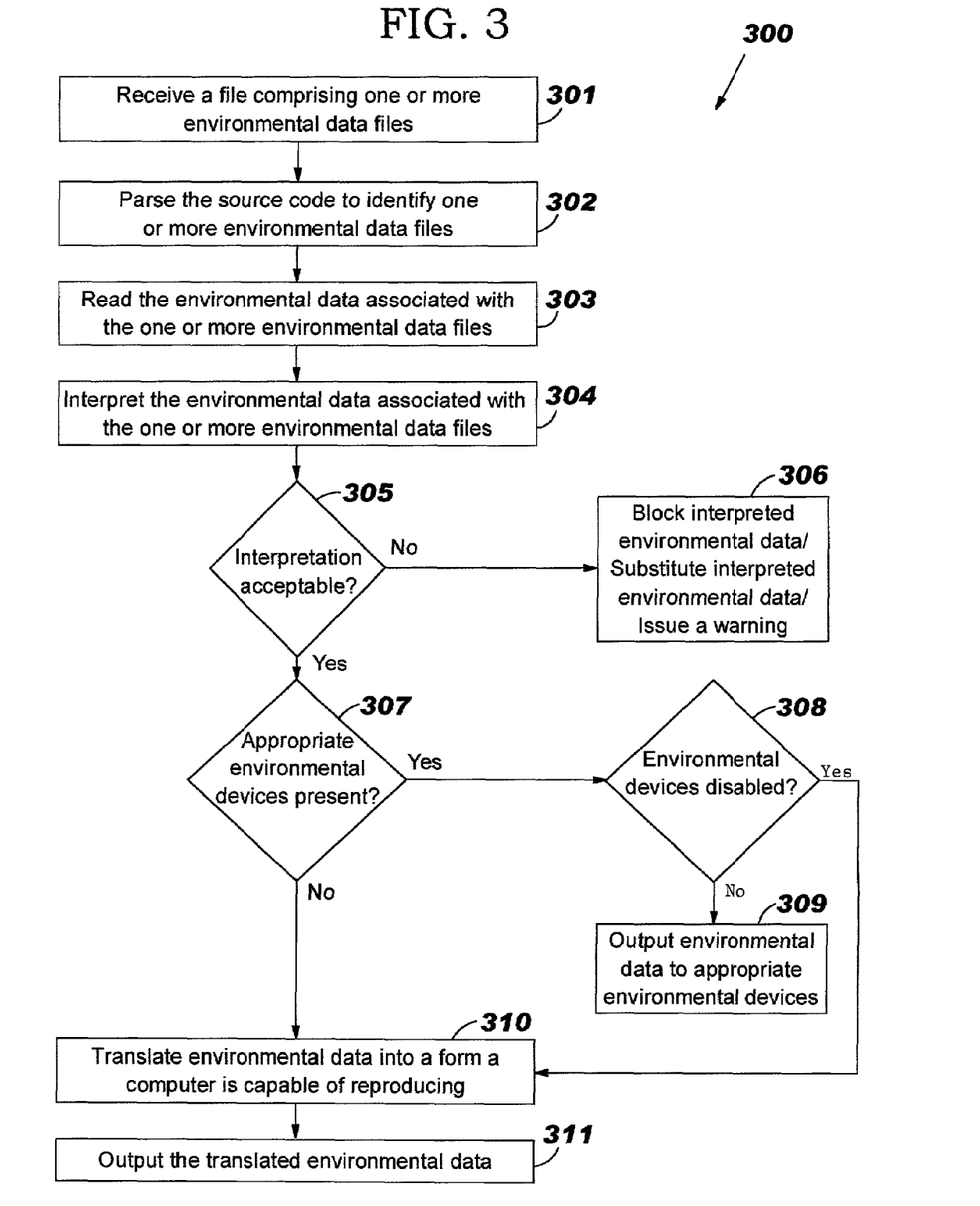
FIG. 3 is a flowchart of a method for generating an alternative form of transmitted environmental data.

FIG. 3—Method for Generating an Alternative Form of Transmitted Environmental Data FIG. 3 illustrates a flowchart of one embodiment of the present invention of a method 300 for generating an alternative form of transmitted environmental data. As stated in the Background Information section, users may receive packets of data from a server via the Internet. The packets of data may comprise what is commonly referred to as environmental data. Environmental data may include data that allows devices, e.g., smell generating devices, coupled to the user's machine configured to emit particular scents such as developed by Digiscents™. However, not all computers may include such devices configured to emit particular scents or other environmental conditions in response to receiving environmental data. It would therefore be desirable to translate and substitute environmental data into a form a computer may be capable of reproducing. Method 300 is a method for translating and substituting environmental data into a form a computer may be capable of reproducing.

In step 301, web browser 121 of client 120 may be configured to receive an HTML file specifying one or more environmental data files forwarded by web page engine 111 of server 110. As stated above, the one or more environmental data files may comprise environmental data which may be used to trigger an environmental response. For example, environmental data may include scent information which may be used by a smell generating device coupled to client 120 to generate a floral scent. An example of a smell generating device may be a scent emulator as described in U.S. Pat. No. 6,024,783, entitled "Aroma Sensory Stimulation in Multimedia," which is hereby incorporated herein in its entirety by reference. In another example, environmental data may include air humidity settings which may be used by a device coupled to client 120 to alter the air humidity settings. Environmental data may further include but not limited to lighting effects such as controlling the amount of ambient light and triggering strobes, special effects, air temperature settings, triggering of airflow effects such as fans and triggering of infrared devices such as to create tactile warmth. It is noted that the one or more environmental data files in the HTML file received by web browser 121 may comprise one or more different types of environmental data, e.g., scent information, air humidity settings.

Figure 4:
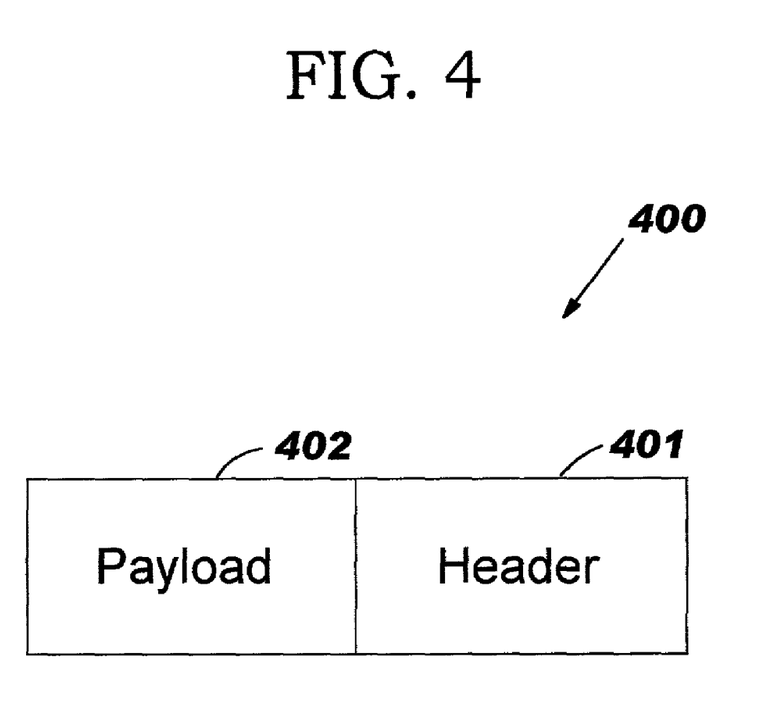
FIG. 4 illustrates an embodiment of a packet of data associated with an environmental data file configured in accordance with the present invention.

In step 302, a program may be configured to parse the HTML source code line by line to identify one or more environmental data files. In one embodiment, one or more environmental data files may be identified by tags in the HTML source code. Each of the one or more environmental data files specified in the HTML file forwarded to client 120 may be represented by packets of data as illustrated in FIG. 4. FIG. 4 illustrates an embodiment of the present invention of a packet 400 of data where packet 400 may comprise a packet header field 401 and a payload 402. Payload 402 may comprise environmental data associated with a particular environmental data file. Packet header field 401 may comprise information as to what format the packet data is written, e.g., GIF, JPEG, PNG, MPEG, MP3. It is noted that packet 400 may comprise other fields and that FIG. 4 is illustrative.

In step 303, the program may be further configured to read the environmental data associated with the one or more environmental data files identified in step 302. As stated above, each of the one or more environmental data files may be represented by packets of data. Payload 402 of a packet 400 of data may comprise environmental data which may be read by the program. In step 304, the program may interpret the environmental data associated with the one or more environmental data files read in step 303. For example, the environmental data may comprise a combination of scent elements that may have to be interpreted in order to determine the particular scent, e.g., floral smell, that is intended to be released in a smell-generating peripheral device.

Upon interpreting the environmental data, a determination may be made as to whether the interpreted environmental data, e.g., floral smell, is acceptable to be implemented in step 305. In one embodiment, acceptable interpreted environmental data to be implemented may be determined based on customizable settings. For example, a user of client 120 may have a profile associated with the user. The profile, which may be stored in a variety of mediums such as disk unit 220, may store a list of default settings where the default settings may refer to environmental data that is acceptable to implement. The settings in the profile may be customizable by allowing a user of client 120 to modify the default settings. For example, a user of client 120 may be able to select particular smells or categories of smells or the strengths of smells that are acceptable. The profile may be modified by any number of means such as through a menu appearing on display 238. It is noted that there are other means of modifying the profile which would be recognized by an artisan of ordinary skill in the art and that such embodiments would fall within the scope of the present invention.

In another embodiment, a user of client 120 may establish acceptable environmental data that may be implemented, e.g., altering the air temperature settings, by creating a file comprising a list of acceptable environmental data. If the interpreted environmental data is not acceptable to be implemented, e.g., unpleasant smell, then the program may block or substitute the interpreted environmental data and/or issue a warning indicating that the interpreted environmental data was unacceptable in step 306. For example, the program may substitute the interpreted environmental data that was unacceptable, e.g., unpleasant smell, with an acceptable environmental response, e.g., pleasant smell.

Referring to step 305, if the interpreted environmental data is acceptable to be implemented, then a determination may be made as to whether there are one or more appropriate environmental devices, e.g., smell-generating peripheral device, configured to emit a response to the interpreted environmental data in step 307. If there are one or more appropriate environmental devices, then a determination may be made in step 308 as to whether the user of client 120 has disabled those one or more environmental devices configured to emit a response to the interpreted environmental data, e.g., floral scent. If the user of client 120 has not disabled those one or more environmental devices, e.g., smell-generating peripheral device, configured to emit a response to the environmental data, e.g., floral scent, then those one or more environmental devices may be executed to emit a response to the environmental data, e.g., produce a floral scent, in step 309.

Referring to step 307, if there are no appropriate environmental devices configured to emit a response to the translated environmental data then the program may be further configured to translate the environmental data into a form client 120 is capable of reproducing in step 310. Referring to step 308, if the user of client 120 has disabled the one or more environmental devices configured to emit a response to the environmental data, then the program may be further configured to translate the environmental data into a form client 120 is capable of reproducing in step 310. Referring to step 310, in one embodiment, the environmental data may be translated by searching a table configured to comprise a listing of entries of interpreted environmental data along with a translated form client 120 is capable of reproducing. For example, the table may comprise an entry of a particular floral scent and an associated entry comprising the translated form of the floral scent, e.g., pointer to a graphics file of a picture of a particular flower. In another embodiment, the environmental data may be translated by executing an algorithm that translates the interpreted environmental data into a form client 120 is capable of reproducing. For example, a temperature or lighting command may be translated by the algorithm into adjusting the background color settings for an active window displayed on display 238. It is noted that there are other methods of translating environmental data into a form a client 120 is capable of reproducing and that the above is illustrative. It is further noted that other methods of translating environmental data into a form a client 120 is capable of reproducing would be recognized by an artisan of ordinary skill in the art and that embodiments employing such methods would fall within the scope of the present invention.

In step 311, the program may output the translated environmental data. The translated environmental data may be presented in one or more of the following forms: pictorial data (e.g., picture of a pine tree substituting a pine smell), graphical effects (e.g., screen-flashing effect may substitute a strobe-light trigger), textual data (e.g., scrolling text, pop-up bubbles), audio data (e.g., synthesized or pre-recorded speech), sound effects (e.g., "sizzling" sound may represent a hot environment setting), and musical selections (e.g., playing a song suggestive of the environmental condition, such as, the song "Everything's Coming Up Roses" substituting a floral scent). It is noted that the outputted translated environmental data may be output in any form and that the above is illustrative. It is further noted that the translated environmental data may be output to display 238, speaker 230 or any other device capable of outputting the translated environmental data. It is further noted that other devices capable of outputting the environmental data would be recognized by an artisan of ordinary skill in the art and that such embodiments would fall within the scope of the present invention.

It is noted that the steps 302–311 of method 300 may be implemented by a program residing in application 250 or disk unit 220. It is further noted that the program of the present invention may be a plug-in to web browser 121 residing in application 250 or disk unit 220. It is further noted that method 300 may be executed in a different order presented and that the order presented in the discussion of FIG. 3 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A computer program product having a computer readable medium having computer program logic recorded thereon for generating an alternative form of transmitted environmental data, comprising:
   programming operable for receiving a file specifying one or more environmental data files;
   programming operable for reading environmental data associated with said one or more environmental data files;
   programming operable for translating said environmental data in response to an unavailability or a disablement of an environmental device configured to emit a response to said environmental data;
   programming operable for outputting said translated environmental data;
   programming operable for parsing source code of said file for said one or more environmental data files, wherein said one or more environmental data files comprises said environmental data;
   programming operable for interpreting said environmental data associated with said one or more environmental data files; and
   programming operable for determining whether said interpreted environmental data is acceptable;
   wherein if said interpreted environmental data is identified as not being acceptable then the computer program product further comprises:
   programming operable for substituting said interpreted environmental data.

2. A computer program product having a computer readable medium having computer program logic recorded thereon for generating an alternative form of transmitted environmental data, comprising:
   programming operable for receiving a file specifying one or more environmental data files;
   programming operable for reading environmental data associated with said one or more environmental data files;
   programming operable for translating said environmental data in response to an unavailability or a disablement of an environmental device configured to emit a response to said environmental data;

programming operable for outputting said translated environmental data;
programming operable for parsing source code of said file for said one or more environmental data files, wherein said one or more environmental data files comprises said environmental data;
programming operable for interpreting said environmental data associated with said one or more environmental data files; and
programming operable for determining whether said interpreted environmental data is acceptable;
wherein if said interpreted environmental data is identified as not being acceptable then the computer program product further comprises:
programming operable for issuing a warning that said interpreted environmental data is identified as not being acceptable.

3. A computer program product having a computer readable medium having computer program logic recorded thereon for generating an alternative form of transmitted environmental data, comprising:
programming operable for receiving a file specifying one or more environmental data files;
programming operable for reading environmental data associated with said one or more environmental data files;
programming operable for translating said environmental data in response to an unavailability or a disablement of an environmental device configured to emit a response to said environmental data;
programming operable for outputting said translated environmental data;
programming operable for parsing source code of said file for said one or more environmental data files, wherein said one or more environmental data files comprises said environmental data; and
programming operable for interpreting said environmental data associated with said one or more environmental data files;
wherein said programming operable for translating said environmental data comprises:
programming operable for searching for an entry in a table based on said interpreted environmental data, wherein said entry comprises a pointer to said translated environmental data.

4. The computer program product as recited in claim 3, wherein said translated environmental data is stored in a file.

5. A system, comprising:
a processor;
a memory unit operable for storing a computer program operable for generating an alternative form of transmitted environmental data;
an input mechanism;
an output mechanism; and
a bus system coupling the processor to the memory unit, input mechanism, and output mechanism, wherein the computer program is operable for performing the following programming steps:
receiving a file specifying one or more environmental data files;
reading environmental data associated with said one or more environmental data files;
translating said environmental data in response to an unavailability or a disablement of an environmental device configured to emit a response to said environmental data;
outputting said translated environmental data;
parsing source code of said file for said one or more environmental data files, wherein said one or more environmental data files comprises said environmental data;
interpreting said environmental data associated with said one or more environmental data files; and
determining whether said interpreted environmental data is acceptable;
wherein if said interpreted environmental data is identified as not being acceptable then the computer program is further operable to perform the following programming step:
substituting said interpreted environmental data.

6. A system, comprising:
a processor;
a memory unit operable for storing a computer program operable for generating an alternative form of transmitted environmental data;
an input mechanism;
an output mechanism; and
a bus system coupling the processor to the memory unit, input mechanism, and output mechanism, wherein the computer program is operable for performing the following programming steps:
receiving a file specifying one or more environmental data files;
reading environmental data associated with said one or more environmental data files;
translating said environmental data in response to an unavailability or a disablement of an environmental device configured to emit a response to said environmental data;
outputting said translated environmental data;
parsing source code of said file for said one or more environmental data files, wherein said one or more environmental data files comprises said environmental data;
interpreting said environmental data associated with said one or more environmental data files; and
determining whether said interpreted environmental data is acceptable;
wherein if said interpreted environmental data is identified as not being acceptable then the computer program is further operable to perform the following programming step:
issuing a warning that said interpreted environmental data is identified as not being acceptable.

7. A system, comprising:
a processor;
a memory unit operable for storing a computer program operable for generating an alternative form of transmitted environmental data;
an input mechanism;
an output mechanism; and
a bus system coupling the processor to the memory unit, input mechanism, and output mechanism, wherein the computer program is operable for performing the following programming steps:
receiving a file specifying one or more environmental data files;
reading environmental data associated with said one or more environmental data files;
translating said environmental data in response to an unavailability or a disablement of an environmental device configured to emit a response to said environmental data;
outputting said translated environmental data;

parsing source code of said file for said one or more environmental data files, wherein said one or more environmental data files comprises said environmental data; and interpreting said environmental data associated with said one or more environmental data files;

wherein said programming step of translating said environmental data comprises the step of:

searching for an entry in a table based on said interpreted environmental data, wherein said entry comprises a pointer to said translated environmental data.

8. The system as recited in claim 7, wherein said translated environmental data is stored in a file.

* * * * *